US008712146B2

(12) United States Patent
Kim et al.

(10) Patent No.: US 8,712,146 B2
(45) Date of Patent: Apr. 29, 2014

(54) METHOD OF CREATING ANIMATABLE DIGITAL CLONE FROM MULTI-VIEW IMAGES

(75) Inventors: Ho Won Kim, Daejeon (KR); Seong Jae Lin, Daejeon (KR); Bo Youn Kim, Daejeon (KR); Il Kyu Park, Daejeon (KR); Ji Young Park, Daejeon (KR); Bon Ki Koo, Daejeon (KR); Ji Hyung Lee, Daejeon (KR); Jin Seo Kim, Daejeon (KR); Seung Wook Lee, Daejeon (KR); Chang Woo Chu, Daejeon (KR); Bon Woo Hwang, Daejeon (KR); Young Jik Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 659 days.

(21) Appl. No.: 12/612,792

(22) Filed: Nov. 5, 2009

(65) Prior Publication Data

US 2010/0158354 A1 Jun. 24, 2010

(30) Foreign Application Priority Data

Dec. 22, 2008 (KR) ........................ 10-2008-0131769

(51) Int. Cl.
*G06K 9/00* (2006.01)
*G06K 9/46* (2006.01)
*G06K 9/36* (2006.01)
*G06T 15/00* (2011.01)

(52) U.S. Cl.
USPC ............ 382/154; 382/203; 382/285; 345/419

(58) Field of Classification Search
None
See application file for complete search history.

(56) References Cited

U.S. PATENT DOCUMENTS

| 7,257,237 B1* | 8/2007 | Luck et al. ..................... 382/103 |
| 2008/0031512 A1 | 2/2008 | Mundermann et al. |
| 2008/0112592 A1 | 5/2008 | Wu et al. |
| 2009/0232353 A1* | 9/2009 | Sundaresan et al. .......... 382/103 |

FOREIGN PATENT DOCUMENTS

| JP | 2007-333690 | 12/2007 |
| KR | 10-0782974 | 11/2007 |

OTHER PUBLICATIONS

Bloomenthal, Approximation of sweep surfaces by tensor product NURBS, 1991, SPIE vol. 1610 Curves and Surfaces in Computer Vision and Graphics II, pp. 132-144.*
Hyun et al, Sweep-based human deformation, 2005, Visual Comput (2005) 21, pp. 542-550.*
"Articulated Mesh Animation from Multi-view Silhouettes," Daniel Vlasic et al., ACM Transactions on Graphics 27(3), pp. 1-9, Aug. 2008.
"Performance Capture from Sparse Multi-view Video," Edilson de Aguiar et al., ACM SIGGRAPH Conference Proceedings, pp. 1-10, 2008.

* cited by examiner

*Primary Examiner* — Barry Drennan
*Assistant Examiner* — David F Dunphy
(74) *Attorney, Agent, or Firm* — Staas & Halsey LLP (57) ABSTRACT

The present invention relates to a method of creating an animatable digital clone includes receiving input multi-view images of an actor captured by at least two cameras and reconstructing a three-dimensional appearance therefrom, accepting shape information selectively based on a probability of photo-consistency in the input multi-view images obtained from the reconstruction and transferring a mesh topology of a reference human body model onto a shape of the actor obtained from the reconstruction. The method further includes generating an initial human body model of the actor via transfer of the mesh topology utilizing sectional shape information of the actor's joints, and generating a genuine human body model of the actor from learning genuine behavioral characteristics of the actor by applying the initial human body model to multi-view posture learning images where performance of a predefined motion by the actor is recorded.

7 Claims, 9 Drawing Sheets

METHOD OF CREATING ANIMATABLE DIGITAL CLONE FROM MULTI-VIEW IMAGES

CROSS-REFERENCE(S) TO RELATED APPLICATIONS

The present invention claims priority of Korean Patent Application No. 10-2008-0131769, filed on Dec. 22, 2008, which is incorporated herein by reference.

FIELD OF THE INVENTION

The present invention relates to a method of creating an animatable digital clone from multi-view images, which is capable of reliably reconstructing an appearance of an actor who takes dynamic motions and the motion information of major joints thereof using image sensors.

BACKGROUND OF THE INVENTION

The technology of capturing information of appearance and motion of an actor who takes dynamic motion has two mainstreams as follows:

One is to use active sensors such as employing laser or patterned light for scanning information of actor's static appearance and capturing joint motions by tracing markers attached on the actor's major body parts where dynamic effects are well observed. Afterwards, a designer manually combines the two types of information to capture dynamic motion of the actor.

Although such a method is commonly used in the field of video contents industry such as making films or advertisements for high-quality visual effects, it requires manual work of many well-trained designers and artists to combine different types of information obtained from various sensors as well as large amount of time to create a model. However, once a three-dimensional (3-D) model of an actor is created, it becomes much easier to edit or make corrections to an appearance or animation of new motions.

Meanwhile, another approach is characterized by capturing an actor's appearance and motion information by means of multi-view images where the actor's dynamic motion is recorded from multiple viewpoints. There exist many different technologies in this method depending on whether or not an initial model is employed and how to initialize the model, application range of multi-view image information, reconstruction priority of appearance and motion, as well as shape deformation method.

Most of recent studies focus on, as a method of reconstructing an actor's appearance and motion information, creating a genuine human body model of the actor from a 3-D scanner or multi-view images of key frames, and deforming an actor model's appearance in a manner that a projection error for each frame is minimized between input multi-view silhouette information obtained by applying the actor model as created above for each frame and the multi-view silhouette information obtained by projecting the actor model onto each camera.

Even when relying on multi-view silhouette information, however, often reported is that the information is not sufficient to represent an actor's appearance who takes a complex motion. Thus, various correction means based on graphical user interface (GUI) are suggested in an effort to deal with such a problem.

Furthermore, the method of creating an actor's genuine human body model by means of a 3-D scanner may suffer imperfect reconstruction of genuine shape deformation characteristics if they have not appeared at an initial actor model. Such a problem is rooted in the limitations of the mesh-based local shape deformation method which is used to handle shape deformation of a human body.

Still further, in case of the method that creates an actor's genuine human body model from multi-view images of key frames, the actor's shape deformation at every motion in the respective frames is reconstructed based on the initial actor model's appearance information, thus extensively dependent on the accuracy of the initial actor model's appearance.

SUMMARY OF THE INVENTION

It is, therefore, an object of the present invention to provide a method of creating an animatable digital clone from multi-view images which relies on silhouette and color information in the multi-view images captured by a plurality of video cameras surrounding an actor and synchronized to one another, as well as on kinematic constraints of a human body. The method allows simultaneous reconstruction of an actor's dynamic appearance information and motion information which tend to change at every frame.

It is, therefore, another object of the present invention is to suggest an implementation of a creating method of an animatable digital clone which facilitates editing of various animations and appearance by learning actor's motion characteristics from the obtained reconstruction information about appearance and motion.

In accordance with the present invention, there is provided a method of creating an animatable digital clone from multi-view images including receiving input multi-view images of an actor captured by at least two cameras and reconstructing a three-dimensional appearance therefrom; accepting shape information selectively based on a probability of photo-consistency in the input multi-view images obtained from the reconstruction and transferring a mesh topology of a reference human body model onto a shape of the actor obtained from the reconstruction; generating an initial human body model of the actor via transfer of the mesh topology utilizing sectional shape information of the actor's joints; and generating a genuine human body model of the actor from learning genuine behavioral characteristics of the actor by applying the initial human body model to multi-view posture learning images where performance of a predefined motion by the actor is recorded.

It is desirable that the method further includes receiving the initial human body model and multi-view images of respective frames of the multi-view posture learning images as input to reconstruct information of an appearance and a motion of the actor for the respective frames; and reconstructing information of the appearance and the motion of the actor simultaneously based on the genuine human body model for respective frames of the multi-view images where a dynamic motion of the actor is recorded.

It is also desirable that the transferring includes combining the probability and anthropometric shape information of the reference human body model; and accepting reconstructed information obtained from the reconstruction or the anthropometric shape information depending on the probability.

It is still desirable that each part of the reference human body model is constructed by parametric representation of sub-joint structure and local mesh topology, thereby allowing shape deformation and motion control performed in parametric control manner.

It is preferable that the parametric representation is a numerical representation where the sub-joint structure is represented by a motional nurbs curve representing a motion of skeletal sub-point structure and the local mesh topology combined with the sub-joint structure is constructed with a nurbs surface being represented as a combination of sectional nurbs curves of sweep-based key frames, said motional nurbs curve being constructed by the sectional nurbs curves.

It is also preferable that the parametric control allows global shape deformation and motion control by numerically manipulating the motional nurbs curve and the sectional nurbs curves of the key frames linked to the nurbs curve.

It is still preferable that reconstructing information of the appearance and the motion of the actor for the respective frames includes parametrically controlling mesh-joint structure of the reference human body model in order to make adjustment thereto such that, when the reference human body model is projected onto the respective multi-view input images, entire foreground pixels of multi-view images are occupied by a projection of a reconstruction object to each camera viewpoint and color information of each pixel is reproduced.

It is preferred that the control of the reference human body model includes a posture control by which rotation of hierarchical sub-joints in a joint structure is controlled such that an occupying error between silhouettes of the multi-view images and projected silhouettes of the reference human body model is minimized, and a shape control which inserts or moves key frames or performs direct control of sectional curves in the key frames in order to minimize residual component of the occupying error and reproduce color information of the pixels.

It is also preferred that the posture control is configured to extract three-dimensional silhouette information of the reference human body model at a viewpoint of each camera and, using information of depth between the viewpoint of the camera and the model, project the three-dimensional silhouette information having actual visibility onto the multi-view images, thus utilizing color edge information on the periphery of the projected silhouettes as additional information.

It is still preferred that the posture control is configured to perform rotation control of an individual joint in the reference human body model such that a differential vector is minimized between a pixel where an intersection of each key frame and a three-dimensional silhouette curve in synthetic multi-view images of the reference human body model is projected onto and two-dimensional silhouettes or the color edges which correspond to a multi-view input region adjacent to a rotational axis of the joint where said each key frame is included.

The present invention enables automatic reconstruction of an actor's appearance and motion information for each frame solely based on a multi-view video image containing therein dynamic motions of the actor, the information from which a 3-D human body model is created where the actor's genuine behavioral characteristics are reproduced. In accordance with the present invention, a digital clone may be created for, not only a human body, but various types of dynamic objects as long as they are vertebrate animals which are provided with a human-like skeletal system and take motions by means of controlling postures of the sub-joints in the skeletal system while maintaining an overall shape, and their mesh-joint structure is defined such that their appearance and motion characteristics can be represented thereby.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
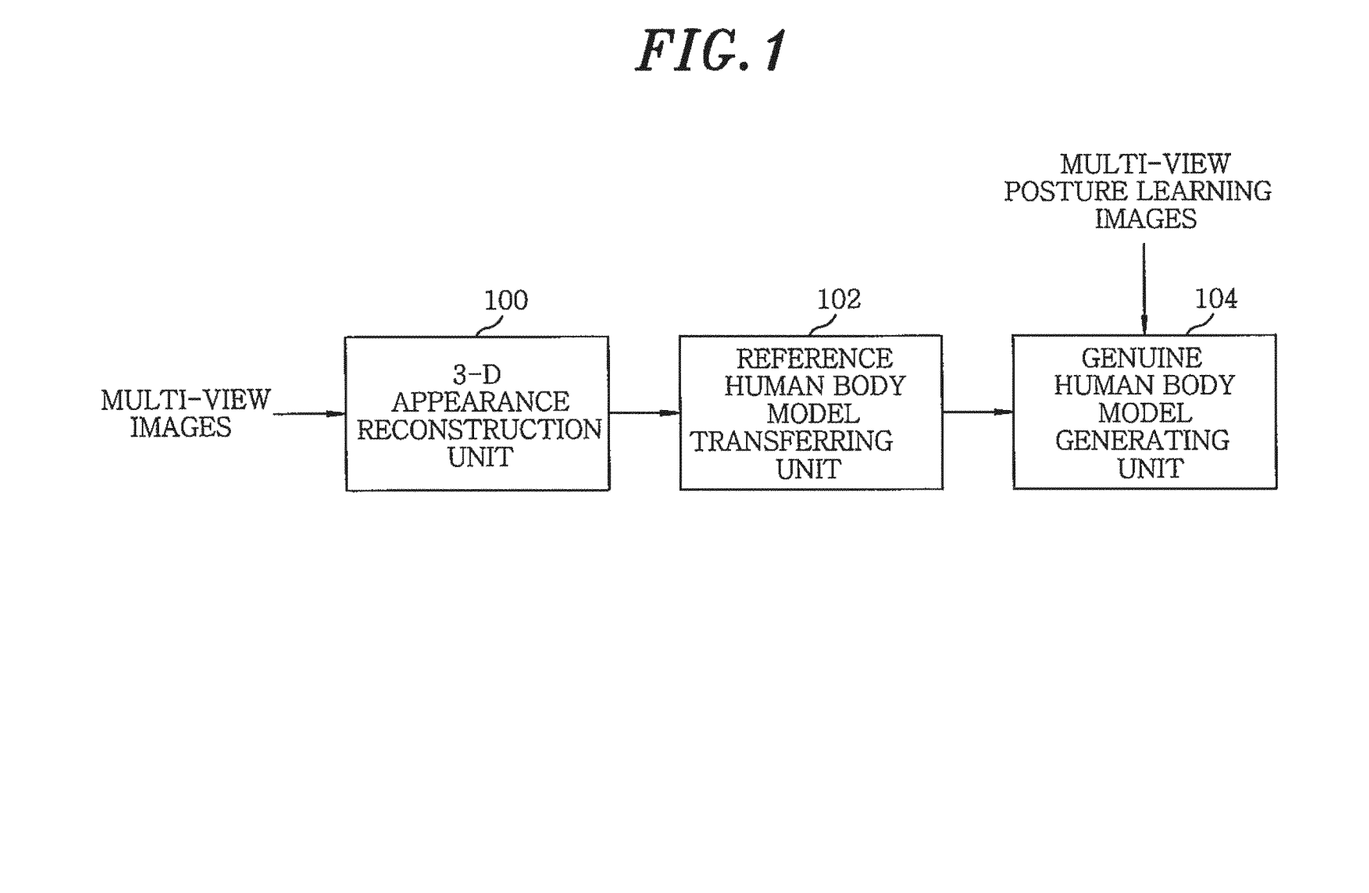
FIG. 1 illustrates a construction of a system implementing a creating method of an animatable digital clone in accordance with an embodiment of the present invention.

Referring now to FIG. 1, there is shown a construction of a system implementing creation method of an animatable digital clone from multi-view images in accordance with an embodiment of the present invention, which includes a 3-D appearance reconstruction unit 100, a reference human body model transferring unit 102 and a genuine human body model generating unit 104.

Figure 3A:
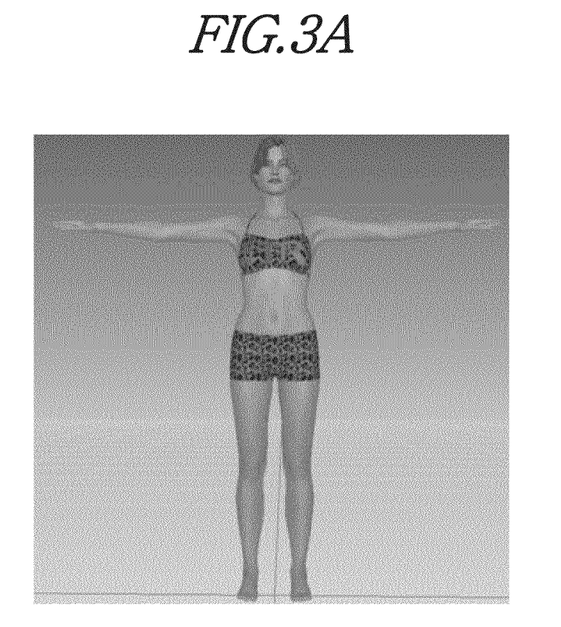
FIGS. 3A and 3B depict an initial posture and its mesh topology of a reference human body model.
Figure 3B:
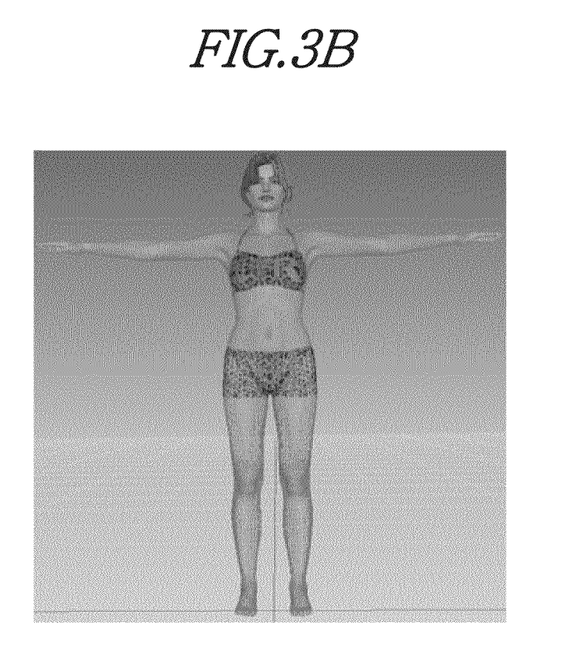

As depicted in FIG. 1, the 3-D appearance reconstruction unit 100 is configured to reconstruct, based on multi-view images, 3-D appearance information with respect to input multi-view images such as T-posture multi-view images of an actor, as illustrated in FIGS. 3A and 3B.

Meanwhile, the reference human body model transferring unit 102 refers to the appearance information reconstructed by the 3-D appearance reconstruction unit 100 in order to accept reconstructed information at an area where the probability is high while accepting anthropometric shape information at an area having low probability. In this manner, an initial human body model is generated by transferring the mesh topology of the reference human body model into the reconstructed shape of the actor.

Then the genuine human body model generating unit 104 applies the initial human body model created by the reference human body model transferring unit 102 to multi-view posture learning images containing a number of predefined motions performed by the actor recorded therein. In this course, a genuine human body model is generated via a procedure of learning genuine motion characteristics of the actor in a manner that a joint structure may accept the actor's motion characteristics.

Figure 2:
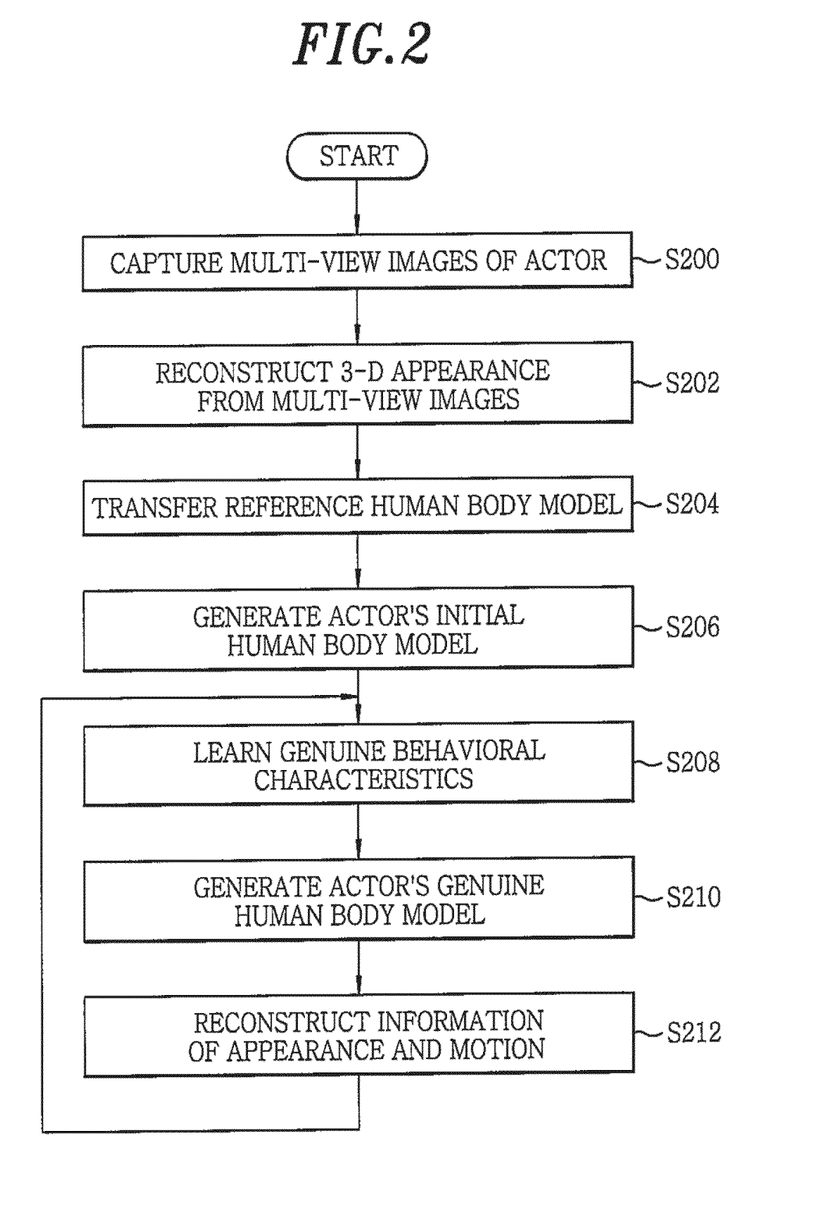
FIG. 2 provides a flow chart showing a procedure of creating an animatable digital clone from multi-view images in accordance with an embodiment of the present invention.

The flow chart presented in FIG. 2 shows a procedure of creating an animatable digital clone from multi-view images in accordance with an embodiment of the present invention. Specifically, illustrated in the figure is generating a human body model of the actor by means of transferring the mesh-joint topology of the reference human body model into the actor's appearance characteristics using multi-view images of the actor captured by multi-view cameras.

In step S200, generating the actor's genuine human body model begins with capturing an initial posture of human body modeling, such as the T-posture illustrated in FIGS. 3A and 3B via multi-view cameras. Thereafter, 3-D appearance information of the actor is reconstructed from the captured multi-view images, in step S202.

The appearance information as mentioned may include color information at the actor's surface, as well as the actor's geometric shape information. For achieving maximum capture of the actor's genuine shape information, two or more cameras are circularly disposed around the actor each of which is arranged so as to look at the actor.

The portion corresponding to the actor's region is separated as a foreground from each of the obtained multi-view images. Then the geometric shape of a 3-D appearance is volumetrically reconstructed into voxels from the information of foreground region at each camera and colors in the foreground. The respective surface voxels are given probability values of photo-consistency with regard to the input multi-view images. Specifically, low probability is given to the voxels less photo-consistent depending on the location of multi-view cameras and the posture of the actor.

In step S204, the mesh topology of a reference human body model is transferred into the reconstructed shape of the actor by means of combining the aforementioned probability values with anthropometric shape information of the reference human body model. Specifically, the transferring procedure is performed by accepting the reconstructed information at an area having a high probability, while accepting the anthropometric shape information at an area where the probability is low.

Then in step S206, the joint information transferred along with the mesh topology is further transferred by use of shape information of the joint section such that it correctly represents the actor, in order to generate an initial human body model of the actor.

The initialized human body model of the actor is, in steps S208 and S210, applied to multi-view posture learning images containing record of various predefined postures taken by the actor in order that the joint structure accepts the motion characteristics of the actor, so as to allow learning of the actor's genuine behavioral characteristics. A genuine human body model of the actor is generated in this course. Since those motions used in learning process of the genuine behavioral characteristics are predefined, the problem of posture initialization and local minima can be avoided.

Once the genuine human body model of the actor is generated, the information of the actor's appearance and motion is reconstructed in step S212, using multi-view images in each frame of the multi-view learning images and the initial human body model as an input. From the reconstruction procedure described here, the mesh topology of the initial human body model and control parameters such as locations and lengths of joints are adjusted iteratively for each frame in a manner that a differential appearance error remaining after optimization is minimized. As a result, generated is the genuine human body model of the actor which is able to reproduce entire multi-view posture learning images.

Figure 4:
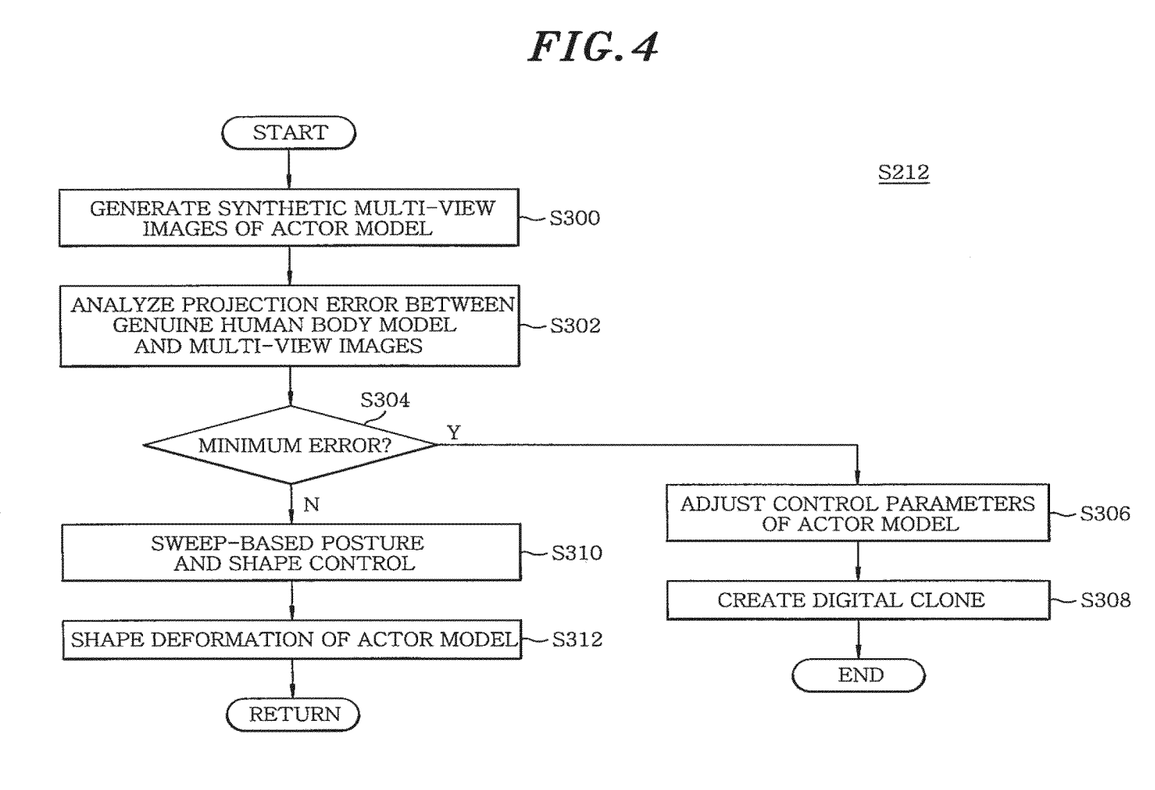
FIG. 4 is a flow chart further illustrating the reconstruction procedure of the appearance and motion information set forth in FIG. 2.
Figure 5A:
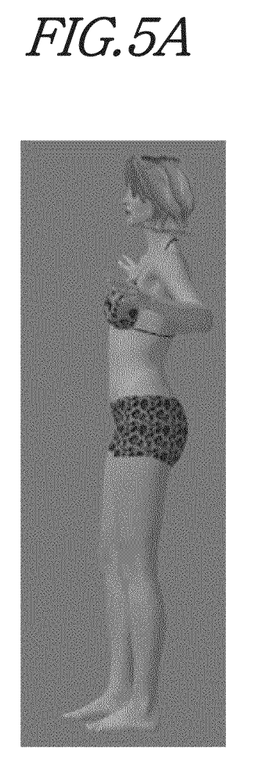
FIGS. 5A to 5D offer calculation of a differential image vector using input images and silhouette information of the corresponding images, color edge information and additional silhouette information obtained from the model's 3-D silhouette information.
Figure 5B:
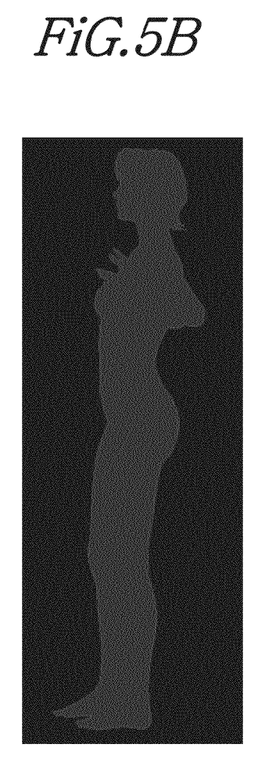
Figure 5C:
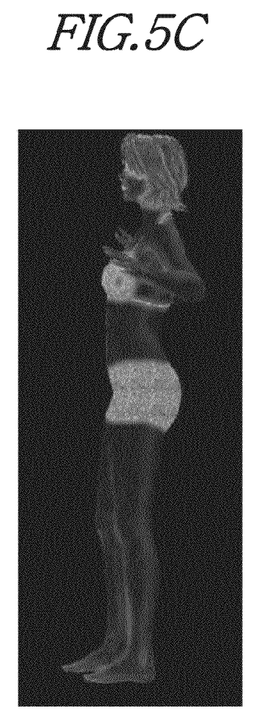
Figure 5D:
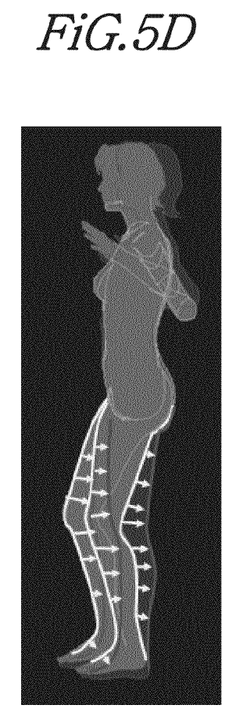
Figure 6A:
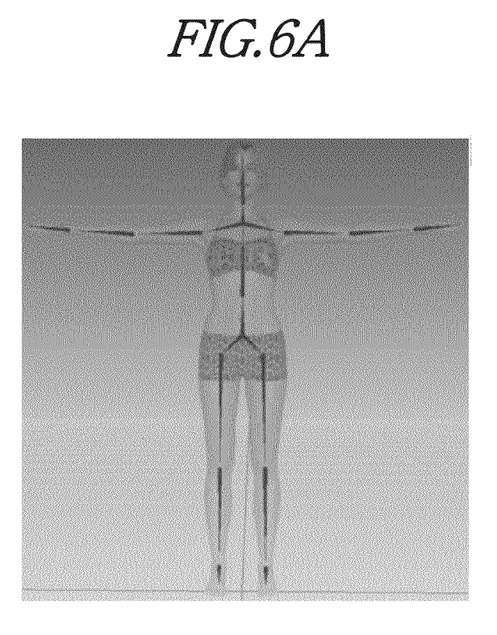
FIGS. 6A to 6D present a sweep surface model employed in deformation of human body's appearance and a motional nurbs curve, a nurbs surface and key frames used to control each sweep surface.
Figure 6B:
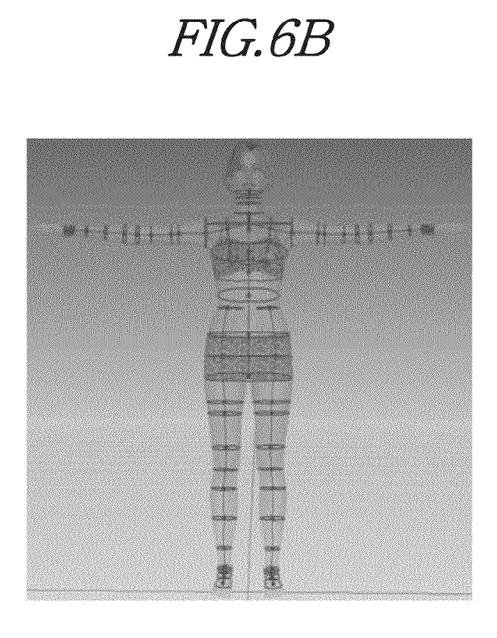
Figure 6C:
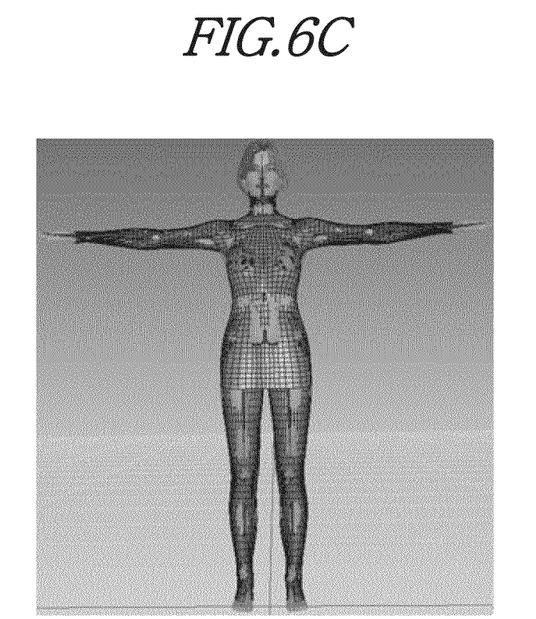
Figure 6D:
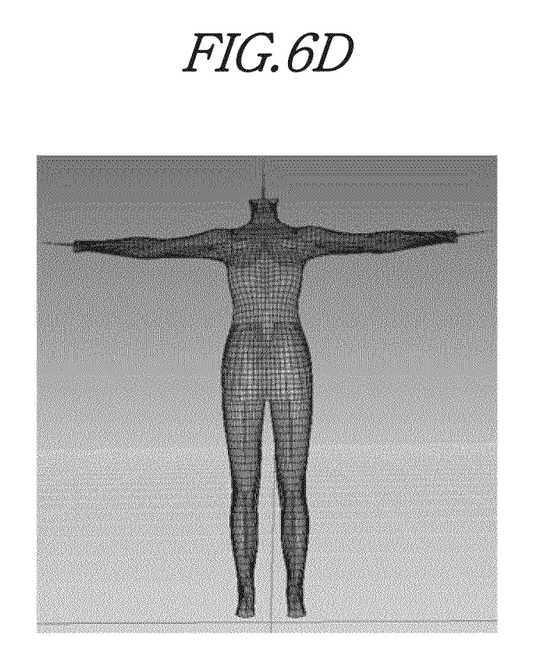

FIG. 4 illustrates, in a detailed manner, the reconstruction procedure of appearance and motion information shown in step S212.

At an initial step, in step S300, synthetic multi-view images are generated by rendering information about meshes and postures of the human body model obtained from the previous frame at a viewpoint of each camera, in order to reconstruct information of appearance and motion of the human body model with a view to reproducing multi-view images being input with every frame. In this course, graphic scenes reflecting lighting information of the environment in which the actor's motion is recorded and correction information in geometric and color aspects for the multi-view cameras are rendered through graphic acceleration, and therefore reliably reproduced is the situation where the cameras take actual record of the actor.

Thereafter, characteristic values for human body model control are extracted in step S302 by analyzing a projection error between two sets of multi-view image information. While most of the former studies rely on two-dimensional (2-D) image silhouette information, the contents of the silhouette information are not sufficient, as shown in FIGS. 5A to 5D, to control each joint of the human body model for reconstruction of the actor's postures taken in a complex manner. Due to the limited amount of information as such, former approaches cannot guarantee accurate reconstruction in most cases by falling into local minima instead of global minima. Thus a user's correction through GUI might be required to solve the problem.

According to the present embodiment, such a local minima problem is addressed with 3-D silhouette information of the human body model, as well as 2-D silhouette information of multi-view images. As illustrated in FIGS. 5A to 5D, in such a case that the silhouette information disappears because of an overlapped leg part, the 3-D silhouette information enables additional extraction of the corresponding characteristic curves from color edge information of input images, using depth information of the model from a viewpoint of the cameras. Extraction of such additional information enables stable performance of extracting control characteristic information in case of complex motions taken by the actor as shown in FIGS. 5A to 5D.

From the projection error extracted as above are extracted 2-D error differentials via error analysis process in step S302. Roughly saying, the error analysis utilizes the portion taken by the synthetic multi-view images of the actor model in foreground region as compared to the foreground region of the input multi-view images, as well as color reproduction rate.

As illustrated by step S304, if two types of error analysis factors do not converge to or exceed a certain threshold value despite controlling the actor model with respect to multi-view images in the frame, the control parameters for the actor model are adjusted based on residual error information in step S306, by which a correction is made to the actor model in order to enable the actor model to clone the actor, in step S308.

In case the analysis result does not suggest a minimum error, control values to control the actor's appearance and posture information are estimated based on control characteristic information, in step S310.

In this embodiment, a sweep-based parametric shape control method is adopted for appearance and posture control of the actor. As depicted in FIGS. 6A to 6D, the whole body is separated into five parts which include a main body part, left and right arm, and left and right leg, and each part is assigned with a motional nurbs curve representing a motion of skeletal sub-point structure and a sweep surface represented by a nurbs surface. Respective sweep surface is controlled parametrically via the motional nurbs curve control based on posture information for multiple key frames including position and rotation for example, and via nurbs surface control based on sectional nurbs curves for the key frames.

In former studies, artificiality has been reported with regard to deformation of a human body, which is caused by an elastic deformation accompanied by the local mesh shape deformation method such as Laplacian deformation. This problem is addressed by linking key frames for the motional nurbs curve control to an anthropometry-based skeletal system and, as an actual method of control, controlling the posture of each joint constituting the skeletal system, thereby minimizing non-real elastic deformation at joint parts.

In addition, when the actor is dressed and thus representation of additional shapes is required, the key frame at the corresponding portion is configured to move, added or deleted, and nurbs curves at each frame can be controlled, in order to easily handle details of shape deformation and representation.

The shape deformation method in the present embodiment enables, through a parametric representation of the reconstructed mesh-joint structure at each frame, effective storage and transmission of a massive amount of reconstructed information. Furthermore, intuitive correction or editing of the reconstructed appearance and motion is enabled while maintaining spatio-temporal coherency.

Meanwhile, control of the actor model's shape deformation in step S312 roughly consists of posture control as well as localized and detailed shape control. As described, the key frame's nurbs curve is extracted in the projection error analysis procedure of step S302 as illustrated in FIG. 4, which is configured to control respective sweep surfaces. The nurbs curve is employed in image Jacobian control using a 2-D displacement vector obtained from error between projected information and the silhouette information for the corresponding input images, to therefore estimate a posture value of a joint in the skeletal system which is linked to each sweep surface. The estimated posture values are applied to the human body model of the actor under actual kinematic constraints for performing a preliminary shape deformation. The shape deformation is performed by iterating above-mentioned posture control at each joint constituting the skeletal system, and then detailed shape information is reconstructed by the residual projection error via controlling the nurbs curve for each key frame.

Such a process is repeated until minimum projection error is obtained or a certain threshold condition is met. In this manner, the information on the actor's appearance and motion is reconstructed simultaneously in a frame-wise manner.

Through this method, a genuine human body model of the actor is generated from the reference human body model. The multi-view posture learning images are employed in this procedure.

Furthermore, the information on the actor's appearance and motion is extracted frame-wise from the multi-view image information containing arbitrary motions taken by the actor as soon as the genuine human body model is generated for the actor. This procedure is illustrated in FIG. 7, at step S412.

Figure 7:
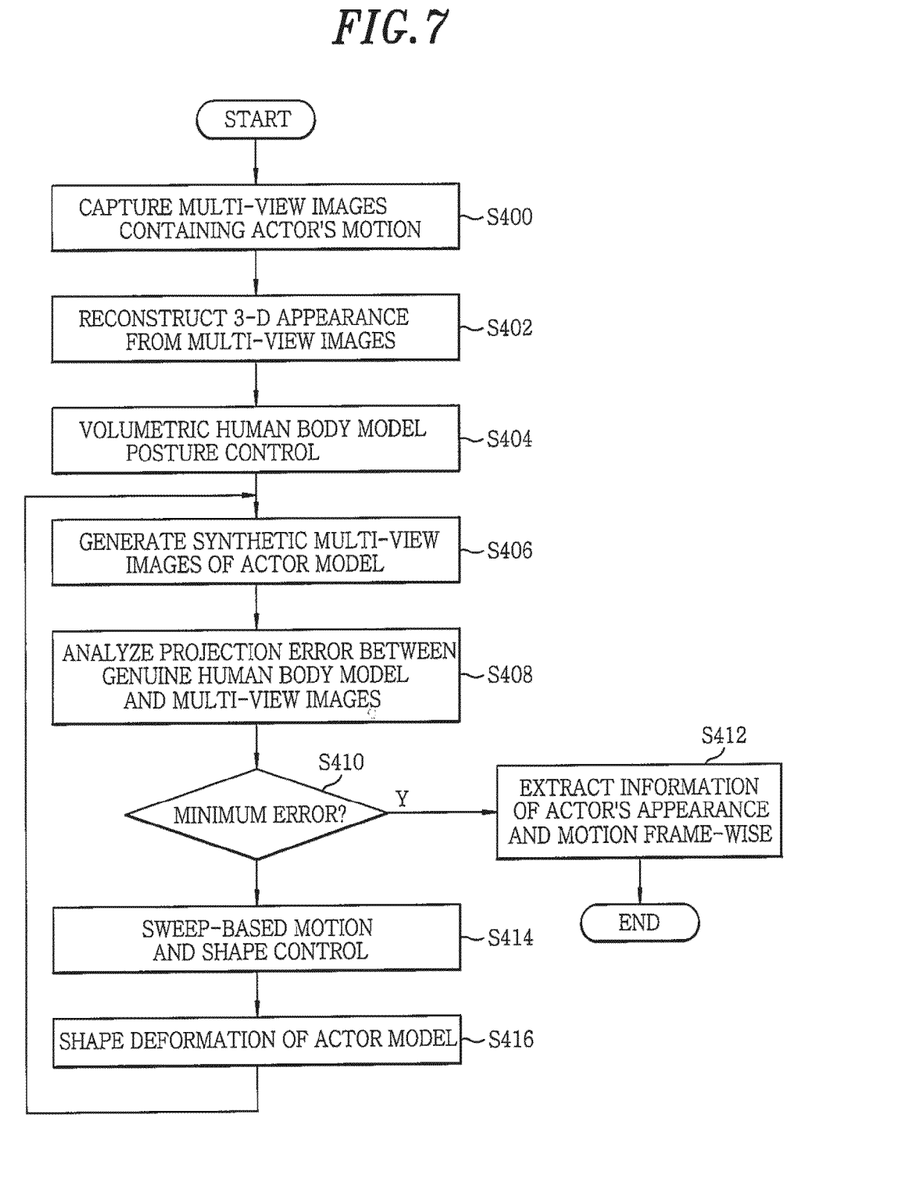
FIG. 7 sets forth a flow chart illustrating the procedure of reconstructing the actor's appearance and motion information with respect to each frame, using the actor's genuine human body model, from a multi-view video image where arbitrary motions taken by the actor are recorded.

The flow chart in FIG. 7 presents a frame-wise procedure of reconstructing appearance and motion from a multi-view video image containing various motions of the actor, using a digital clone technology in accordance with the present embodiment. The illustrated process is differentiated from a procedure of generating a genuine human body model from a multi-view posture learning video image in that a volumetric 3-D appearance is reconstructed at an initial part of each frame in a manner that allows acceptance of arbitrary motions of the actor, as shown in step S402, and in the next step S404, the posture of the human body model is controlled by utilizing the volumetric 3-D information obtained from 3-D appearance reconstruction.

The posture of the actor is roughly corrected by reconstructing the 3-D appearance from multi-view images as shown in step S402 and the volumetric human body posture control of step S404. Then the information on the actor's appearance and motion is reconstructed frame-wise by iterating a set of routines corresponding to those depicted in FIG. 4, such as generating a synthetic multi-view images of the actor model in step S406, analyzing projection error between the genuine human body model and multi-view images in step S408, determining whether or not the analyzed projection error is minimum in step S410, sweep-based posture and shape control as shown in step S414, and shape deformation of the actor model in step S416.

While it requires extended reconstruction time since volumetric reconstruction is needed frame-wise, the posture estimation in 3-D space enables more intuitive control and helps to eliminate possibility of falling into local minima, as compared to that in 2-D space.

In step S402 of FIG. 7, different from step S202 of FIG. 2, appearance reconstruction requires low-level of voxel resolution to achieve high efficiency in reconstruction time. Whereas voxels with 1 mm size are used in step S202, step S402 may be configured to adopt voxels about 8 mm in size.

Aforementioned process allows frame-wise extraction of appearance and motion information for dynamic motions of the actor, creation of a digital clone maintaining genuine patterns of behavior of the actor from a learning process based on the extracted information, and simultaneous reconstruction of frame-wise appearance and motion information from a multi-view video image containing various dynamic motions of the actor, based on the created digital clone.

While the invention has been shown and described with respect to the embodiments, it will be understood by those skilled in the art that various changes and modification may be made without departing from the scope of the invention as defined in the following claims.

What is claimed is:

1. A method of creating an animatable digital clone from multi-view images, comprising:
   receiving input multi-view images of an actor captured by at least two cameras;
   reconstructing 3D shape information of the actor selectively based on a probability of photo-consistency in the input multi-view images and transferring a mesh topology of a reference human body model onto a shape of the actor obtained from the reconstruction;
   generating an initial human body model of the actor via transfer of the mesh topology utilizing sectional shape information of the actor's joints by controlling a shape and a posture of the reference human body model;
   generating a genuine human body model of the actor from learning genuine behavioral characteristics of the actor by applying the initial human body model to multi-view posture learning images where performance of a predefined motion by the actor is recorded; and
   reconstructing information of an appearance and a motion of the actor by using the initial human body model and multi-view images of respective frames of the multi-view posture learning images as an input,
   wherein the transferring includes:
      combining the probability of photo-consistency, an anthropometric shape information and the mesh topology of the reference human body model;

accepting reconstructed information obtained from the reconstruction when the probability is high; and accepting the anthropometric shape information when the probability is low, wherein each part of the reference human body model is constructed by parametric representation of sub-joint structure and local mesh topology, thereby allowing shape deformation and motion control performed in parametric control manner, wherein the reconstructed 3D shape of the actor is separated into at least five parts and each part is mapped to the corresponding part of the reference human body model, and assigned a motional nurbs curve representing a motion of skeletal sub-point structure and a sweep surface represented by a nurbs surface, and wherein, each respective sweep surface of the reference human body model is controlled and deformed parametrically via the motional nurbs curve based on posture information of the actor and via the nurbs surface based on the 3D shape information of the actor.

2. The method of claim 1, wherein the parametric representation is a numerical representation where the sub-joint structure is represented by the motional nurbs curve representing a motion of skeletal sub-point structure and the local mesh topology combined with the sub-joint structure is constructed with the nurbs surface being represented as a combination of sectional nurbs curves of sweep-based key frames, said motional nurbs curve being constructed by the sectional nurbs curves.

3. The method of claim 2, wherein the parametric control allows global shape deformation and motion control by numerically manipulating the motional nurbs curve and the sectional nurbs curves of the key frames linked to the nurbs curve.

4. The method of claim 2, wherein the sweep-based key frames are linked to the sub-joint structure.

5. The method of claim 1, wherein reconstructing information of the appearance and the motion of the actor for the respective frames includes parametrically controlling mesh-joint structure of the reference human body model in order to make adjustment thereto such that, when the reference human body model is projected onto the respective multi-view input images, entire foreground pixels of multi-view images are occupied by a projection of a reconstruction object to each camera viewpoint and color information of each pixel is reproduced.

6. The method of claim 5, wherein the control of the reference human body model includes a posture control by which rotation of hierarchical sub-joints in a joint structure is controlled such that an occupying error between silhouettes of the multi-view images and projected silhouettes of the reference human body model is minimized, and a shape control which inserts or moves key frames or performs direct control of sectional curves in the key frames in order to minimize residual component of the occupying error and reproduce color information of the pixels.

7. The method of claim 6, wherein the posture control is configured to extract three-dimensional silhouette information of the reference human body model at a viewpoint of each camera and, using information of depth between the viewpoint of the camera and the model, project the three-dimensional silhouette information having actual visibility onto the multi-view images, thus utilizing color edge information on the periphery of the projected silhouettes as additional information.

* * * * *